United States Patent
Keusch et al.

(10) Patent No.: US 9,050,741 B2
(45) Date of Patent: Jun. 9, 2015

(54) METHOD AND DEVICE FOR CLEANING AN EXTRUSION HEAD

(75) Inventors: Stefan Keusch, Brühl (DE); Frank Schüller, Vettweiss-Gladbach (DE)

(73) Assignee: Mauser-Werke GmbH, Bruehl (DE)

( * ) Notice: Subject to any disclaimer, the term of this patent is extended or adjusted under 35 U.S.C. 154(b) by 0 days.

(21) Appl. No.: 14/118,460

(22) PCT Filed: Jun. 7, 2011

(86) PCT No.: PCT/EP2011/002781
§ 371 (c)(1),
(2), (4) Date: Nov. 18, 2013

(87) PCT Pub. No.: WO2012/167802
PCT Pub. Date: Dec. 13, 2012

(65) Prior Publication Data
US 2014/0103559 A1 Apr. 17, 2014

Related U.S. Application Data

(60) Provisional application No. 61/494,152, filed on Jun. 7, 2011.

(51) Int. Cl.
*B29C 47/00* (2006.01)
*B29C 47/08* (2006.01)
(Continued)

(52) U.S. Cl.
CPC ......... *B29C 47/0038* (2013.01); *B29C 47/0026* (2013.01); *B29C 47/0877* (2013.01); *B29C 47/0883* (2013.01); *B29C 47/20* (2013.01);
(Continued)

(58) Field of Classification Search
CPC ............ B29C 47/0883; B29C 47/0877; B29C 47/0011; B29C 47/0021; B29C 47/003; B29C 47/30; B29C 47/12
USPC ............................................. 264/39; 425/155
See application file for complete search history.

(56) References Cited

U.S. PATENT DOCUMENTS

2008/0099940 A1 5/2008 Pettitt

FOREIGN PATENT DOCUMENTS

| AU | B-75378/96 | 6/1997 |
| DE | 202010007275 | 7/2011 |

(Continued)

OTHER PUBLICATIONS

Copy of International Search Report issued by the European Patent Office in International Application PCT/EP2011/002781 on Feb. 9, 2012.

*Primary Examiner* — Jacob Thomas Minskey
(74) *Attorney, Agent, or Firm* — Henry M. Feiereisen LLC

(57) ABSTRACT

The present invention relates to a method and a device for cleaning extrusion heads (10) in the extrusion of thermoplastic plastic materials which are ejected or extruded as tubular preform (12) from an extrusion nozzle (14). For removing interfering deposits and cakings (20) on the discharge nozzle (14), according to the present invention the tubular preform (12) is briefly deflected and upset, wherein the deposits (20) adhering in a proximate region of the discharge nozzle (14) are wiped off from the tubular preform (12) and transported away. Advantageously, the tubular preform (12) is during its deflection itself used as cleaning element, wherein the cleaning takes place automatically during the continuous operation of the continuous extrusion without interrupting the production process.

10 Claims, 5 Drawing Sheets

(51) Int. Cl.
   *B29C 47/20*    (2006.01)
   *B29C 47/34*    (2006.01)
   *B29C 47/90*    (2006.01)
   *B29C 49/04*    (2006.01)
   *B29K 23/00*    (2006.01)
   *B29L 31/00*    (2006.01)

(52) U.S. Cl.
   CPC ............... *B29C47/34* (2013.01); *B29C 47/90* (2013.01); *B29C 49/04* (2013.01); *B29K 2023/065* (2013.01); *B29L 2031/7126* (2013.01)

(56) References Cited

FOREIGN PATENT DOCUMENTS

| | | |
|---|---|---|
| IE | S72482 | 4/1997 |
| JP | 08-332668 | 12/1996 |
| JP | 2003-305761 | 10/2003 |

METHOD AND DEVICE FOR CLEANING AN EXTRUSION HEAD

CROSS-REFERENCES TO RELATED APPLICATIONS

This application is the U.S. National Stage of International Application No. PCT/EP20117/002781, filed Jun. 7, 2011, which designated the United States and has been published as International Publication No. WO 2012/167802.

This application claims the benefit of prior filed U.S. provisional Application No. 61/494,152, filed Jun. 7, 2011, pursuant to 35 U.S.C. 119(e).

BACKGROUND OF THE INVENTION

The present invention relates to a method and a device for cleaning extrusion heads during the extrusion of thermoplastic plastic materials, which are expelled (extruded) from an extrusion nozzle.

When processing thermoplastic plastic materials, such as polyolefins—predominantly with medium- and high-molecular polyethylene types, such as HDPE, for example, during extrusion blow molding, in particular during continuous extrusion with continuous tube discharge, but also with discontinuous tube discharge (storage heads, accumulator-heads), the following disadvantageous effect occurs:

Ejected liquid molten plastic is under high pressure in the extrusion device (e.g., extrusion head). After exiting the extrusion nozzle, the plastic relaxes to atmospheric pressure and thereby swells. During the exiting process, gel-type products (lubricants, additives) are segregated from the hot plastic strand over time, in particular with continuous extrusion, and are deposited as harmful material buildup in the proximate region of the nozzle mouth, with ring-shaped nozzles primarily in the interior on the core, but also on the exterior nozzle mouthpiece. Ring-shaped discharge nozzles therefore have the problem that these deposits are also not visible. The deposits (precipitates) result from low-molecular components of the polymer melt (e.g., short polymer chains, additives, wax-like components), which deposit on the discharge edges of the nozzle channel when the melt exits due to the sudden decrease in pressure and the decrease in the wall shear stress.

The gel-type products are continuously exposed to high temperatures and are transformed into resin and coke within a relatively short time. These progressively growing deposits become brittle and then break off or disintegrate uncontrollably. These crumbs or chunks, which can be several centimeters long, fall into the extruded tube and damage the finished products (for example, when producing a drum, leaky weld seams can be created on the bottom when such porous coke particles enter the region of the weld seam).

For example, the particles may only loosely adhere to the interior wall of the blown finished product (e.g., a tight-head drum) and may break off and fall off when the hollow body is filled with the actual charge, and may thus reach and contaminate the charge.

The deposits (gel-type products, takings) have initially a low-viscosity consistency. The deposits oxidize over time due to the high temperatures of nozzle and core and through exposure to oxygen from the ambient air, and the viscosity increases until first solid regions are formed by coking.

The outside deposits on the discharge nozzle grow uncontrollably. In particular in the blow molding technique, where a tubular preform is expelled from a ring-shaped nozzle, in particular during continuous melt discharge, the inner core region of the discharge nozzle is not visible.

When the deposits have grown too much and become brittle, they are carried along from time to time by the inside of the passing melt tube and adhere on the interior surface of the produced product, for example a plastic tight-head drum. This disadvantageously causes contamination of the charge after the drum has been filled.

During a subsequent detachment from the interior wall of a drum, this may cause feed pumps to become plugged or damaged and may significantly impair the subsequent processing processes of the charge. If such coke particles reside in the region of the weld seam of the blow-molded container, then this can disadvantageously and impermissibly weaken the container (leaks).

Moreover, such deposits may cause longitudinal stripes to form, causing optical and/or technical defects of the extruded and subsequently blow-molded product.

This phenomenon is also referred to as "die build-up", wherein the deposits of thermally damaged polymers on the nozzle exit cause undesirable surface irregularities. In commercially available plastics, individual additives in general (such as stabilizers or flow promoters) for influencing wall slip effects lead to or cause sticky deposits.

These problems are known, for example, from the technical field of blown film extrusion. The deposits are here stripped with mechanical cleaning devices, such as scrapers, and transported to the waste area, which is during film blowing always produced when the winding spindles are changed.

However, in the cleaning process of extrusion tools practiced to date, the extrusion process must be stopped for performing the partially manual mechanical cleaning of the nozzle core directly below the discharge edge of the melt.

Stopping the extrusion process causes a loss in production due to the idle time; on the other hand, the facility must then be started up again by a knowledgeable process engineer and placed into a stable operating state.

SUMMARY OF THE INVENTION

It is an object of the present invention to obviate the disadvantages of the state-of-the-art and to provide a method and a device for cleaning the discharge region of extrusion tools, in particular of ring-shaped nozzles with a core, which functions during the ongoing operation of the continuous extrusion without interruption of the production process. The material deposits should hereby be specifically transported away and removed from the production process.

This object is attained by the method having the inventive features of claim 1 by briefly deflecting and upsetting the tubular preform, wherein the deposits adhering on the outside in the proximate region of the discharge gap of the extrusion nozzle are wiped off from the tubular preform and transported away. The key of the invention is that the tubular preform itself is used as the cleaning element during its deflection.

In this inherently simple manner, the cakings formed during the extrusion process and deposited in the proximate region of the discharge nozzle can be detached and removed during the ongoing operation of the continuous extrusion without interrupting the production process.

According to an embodiment of the invention, the deflection of the tubular preform for cleaning the extrusion nozzle is performed in predetermined time intervals. Advantageously, the tubular preform is deflected for cleaning the extrusion nozzle exactly when the tubular piece is expelled from the extrusion nozzle, which is subsequently removed from the finished blown hollow body as waste slug piece.

For specifically transporting the material deposits away and removing them from the production process, those tubular pieces, to which the cleaned deposits adhere, are—after deflection of the tubular preform—sorted out from the subsequent production process.

According to a preferred embodiment of the invention, the tubular preform is deflected by way of pressing elements in the shape of a partial circle, which directly enclose the preform from the outside below the discharge nozzle by almost 360° and deflect the preform inwardly.

For attaining the underlying object, the device according to the invention for cleaning extrusion heads during the extrusion of thermoplastic plastic materials, which are expelled from an extrusion nozzle, is characterized in that mechanical engagement means with a corresponding drive are provided directly below the extrusion nozzle, wherein the engagement means can be brought into operative contact with the extruded tubular preform by the corresponding drive.

In a simple embodiment, the mechanical engagement means may include, for example, two or more elements in form of circular segments, which can be closed, i.e., moved, in the radial direction with actuators and then form a substantially closed circular ring in the retracted position. The actuators may be operated in different ways, for which they may be provided, for example, with an electro-pneumatic, electro-hydraulic or electrical drive.

MODE OF OPERATION

The closed circular segment elements forming a circular ring radially upset the exiting molten tube directly below the outlet nozzle for a predetermined time. During the predetermined time, the upset molten tube then flows radially inwardly over the edge of the core and carries the material deposited in this region with it.

The time for closing the circular segments and the holding time in the closed state are freely selectable and adjustable.

The cleaning times are preferably adjusted such that the ring-shaped deposits which are detached all around are located in the waste slug region of the subsequently produced container.

The exiting molten tube itself is used as the cleaning medium, thus preventing mechanical contact between the engagement means, the actuators or the circular segments and the nozzle tool.

In this way, the interior nozzle core is gently cleaned without applying mechanical scratching, scraping or cutting aids. The particular type of nozzle cleaning prevents damage to the precisely manufactured flow channel geometries in the nozzle region.

The circular segment elements move contactless below the extrusion nozzle. Advantageously, the engagement means are constructed to be adjustable in the height and/or depth direction (radial direction) and thus adaptable to the exiting tube.

During nozzle cleaning and with the continuously exiting melt, the brief upsetting of the tube against the nozzle core simultaneously causes swelling of the tube in the circumferential direction (outwardly) between the nozzle discharge edge and the closed circular segments. The outwardly swelling molten tube then also tears away the ring-shaped deposits adhering to the outside of the nozzle discharge edge.

The cleaning cycle of the process may be freely adjusted (e.g., every two hours, every x cycles) and may include repeats of the cleaning (1x or consecutively several times), depending on the tendency of the raw material used in the process to deposit and the growth of the takings. Contaminated tube sections or contaminated slug waste are intentionally separated and transported away. This prevents contamination of the raw material cycle (re-granulate) with material containing coke deposits. If the slug regions are too short for a complete cleaning (e.g., with an exceedingly high tube exit velocity), then the entire following article may also be separated and disposed of (only a single piece of scrap material).

The method of the invention and the device constructed for carrying out the method can advantageously be retrofitted in all extrusion blow molding machines with continuous melt discharge. In principle, the method can of course also be used and retrofitted in accumulator head machines with discontinuous melt discharge.

The method, and in particular the device, can be applied in many situations and can be combined with very different extrusion head designs, for example with a fixed nozzle/core structure (without axial wall thickness control), with a conventional nozzle/core structure (only axial wall thickness control), or with fully adjustable wall thicknesses of the extruded tubular preform with nozzle and/or core with statically and/or dynamically flexibly adjustable diameter geometries (axial and radial wall thickness adjustment=PWDS).

BRIEF DESCRIPTION OF THE DRAWING

The invention will now be explained and described in more detail with reference to exemplary embodiments schematically illustrated in the drawings. It is shown in.

DETAILED DESCRIPTION OF PREFERRED EMBODIMENTS

Figure 1:
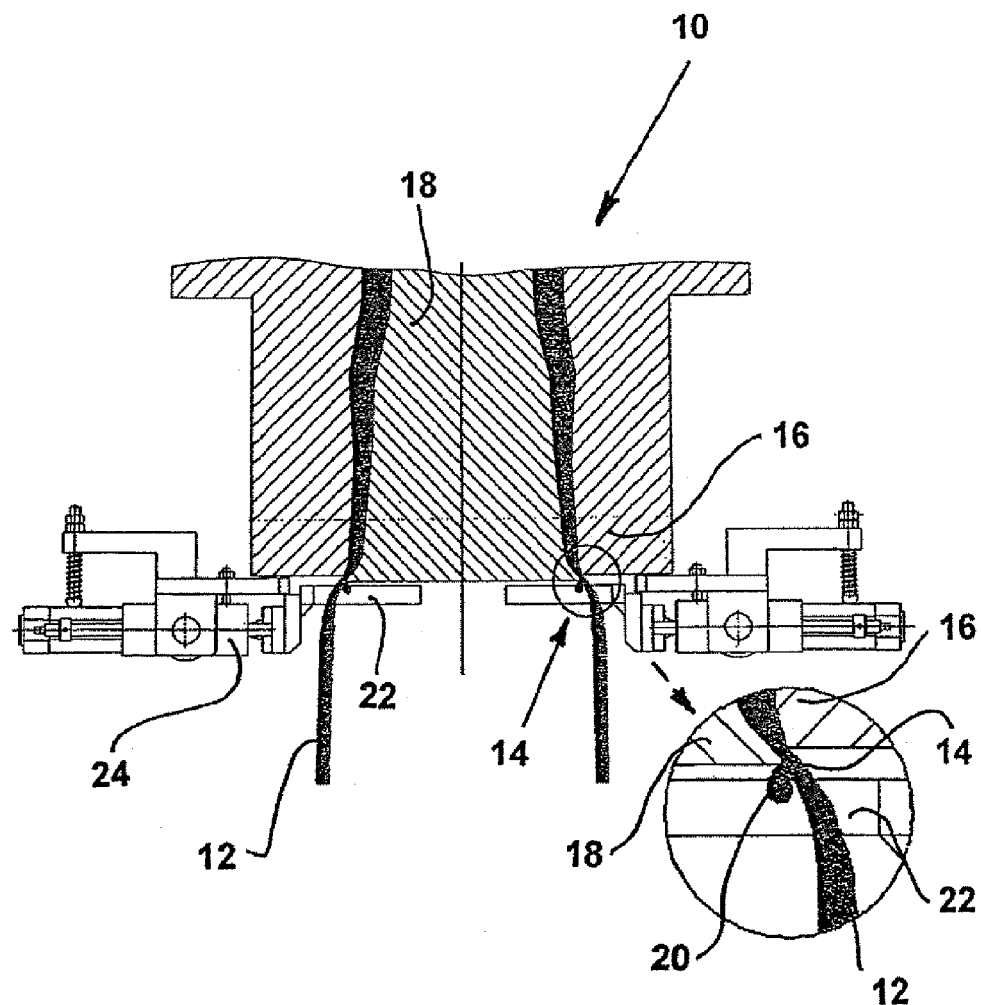
FIG. 1 in a cross-sectional view, an extrusion head according to the invention in a detailed diagram in the operating position "open", FIG. 2 in a cross-sectional view, an extrusion head according to the invention in a detailed diagram in operating position "closed", FIG. 3 in a plan view from below, an extrusion head according to the invention with two circular segment engagement means in the operating position "open", FIG. 4 in a plan view from below, an extrusion head according to the invention with two circular segment engagement means in the operating position "closed", FIG. 5 in a plan view from below, an extrusion head according to the invention with four circular segment engagement means in the operating position "open", FIG. 6 in a plan view from below, an extrusion head according to the invention with four circular segment engagement means in the operating position "closed", and FIG. 7 a blow-molded tight-head drum with two slug pieces.

FIG. 1 shows with the reference numeral 10 an extrusion head according to the invention, wherein a tubular preform 12 made of heated thermoplastic plastic material is ejected from a discharge nozzle 14. The discharge nozzle 14 is defined on the outside by a housing ring 16 and on the inside by a core 18. The core 18 is axially adjustable for changing and/or adjusting the wall thickness of the ejected preform 12 made of a molten plastic (e.g., HDPE) during the extrusion process depending on the requirement of the hollow body to be molded.

Ring-shaped cakings 20 are formed during the extrusion process in the proximate region of the discharge nozzle 14 on the exterior edge of the inner core and also on the interior edge of the outer housing-side outer ring 16 which—when the cakings have become too large—may from time to time uncontrollably fall off, thus disadvantageously rendering the respective finished product unusable.

To get a handle on this disadvantageous effect and to controllably execute the process for removing these cakings 20, two or more engagement means 22 which are each actuatable by an actuator 24 are provided on the extrusion head 10 according to the invention.

The engagement means are constructed as a tongue-like, rib-shaped pressing tool, which is arranged directly below the discharge opening of an extrusion head and provided with a displacement drive for movement into the normal path of the ejected plastic tube. The pressing tool for a ring-shaped extrusion nozzle is made of at least two or more tongue-like, rib-shaped pressing elements which enclose the ejected plastic tube from the outside and can move the ejected plastic tube substantially transversely to the injection direction of the plastic tube. The pressing elements or engagement means 22 are sealingly attached to the actuator 24 below the discharge nozzle 14 on the housing side on the outer ring 16 of the discharge nozzle or directly on the housing of the extrusion head 10.

The ring-shaped cakings 20 adhering to the exterior edge of the inner core 18 can be clearly seen in the enlarged encircled section. The engagement means 22 are hereby in the position "open" and the tubular preform 12 flows closely past the ring-shaped cakings 20.

Figure 2:
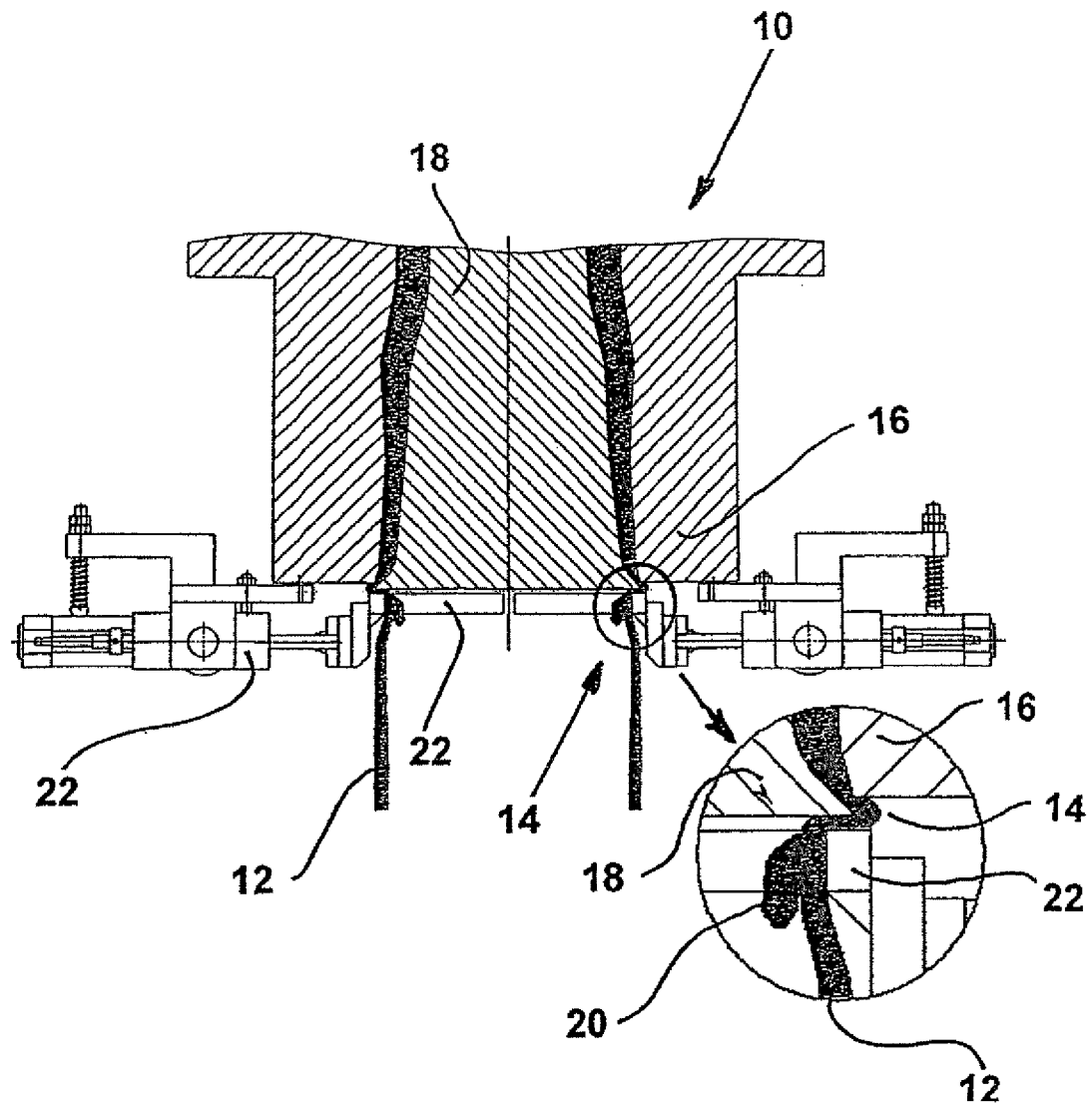

Conversely, as illustrated in FIG. 2, the engagement means 22 are moved by their respective actuator 24 into the position "closed" and brought into operative engagement with the ejected tubular preform 12, As can be seen, the tubular preform 12 is briefly deflected inwardly and the caking 20 adhering to the exterior edge of the inner core 18 is wiped off, so that the caking only adheres to the inside of the tubular preform 12 and is transported away. The tubular preform 12 is simultaneously upset above the engagement means 22, likewise only briefly, and bulged outwardly, so that ring-shape cakings adhering there—on the interior edge of the outer housing-side outer ring 16—are also pushed off, wiped off and stick to the outside on the tubular preform 12, and are transported away. The tubular preform 12 itself is hereby also used during its deflection as a cleaning element.

Figure 3:
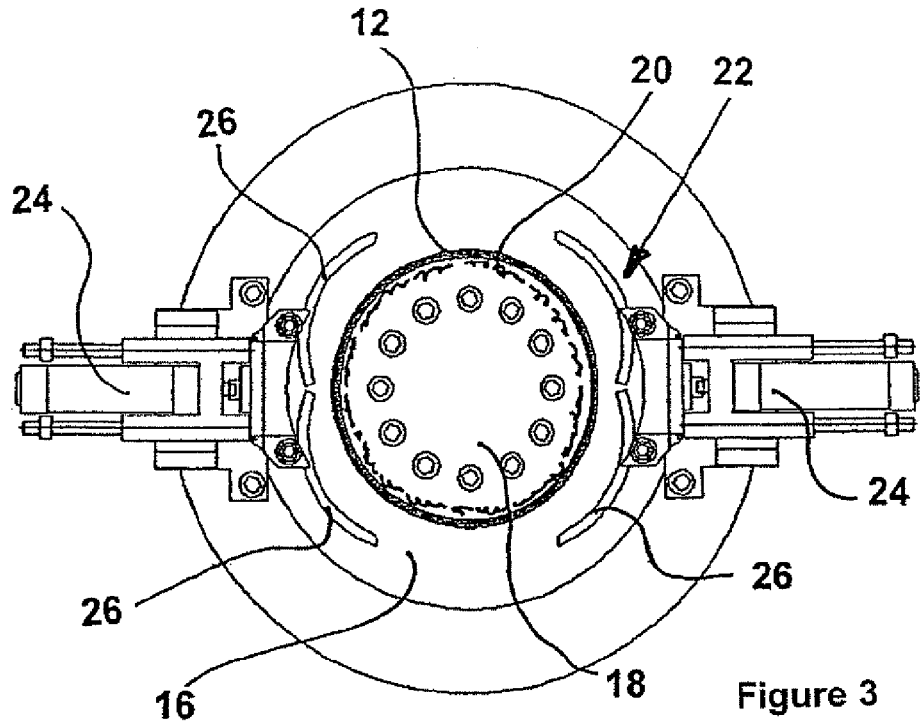

FIG. 3 shows the extrusion head 10 according to the invention in a plan view from below, illustrating the two engagement means 22 with their respective actuator 24 in the "open" position. Each of the two engagement means 22 in this variant includes two movably suspended 90° circular segment elements 26 which are still clearly spaced from the tubular preform 12.

Figure 4:
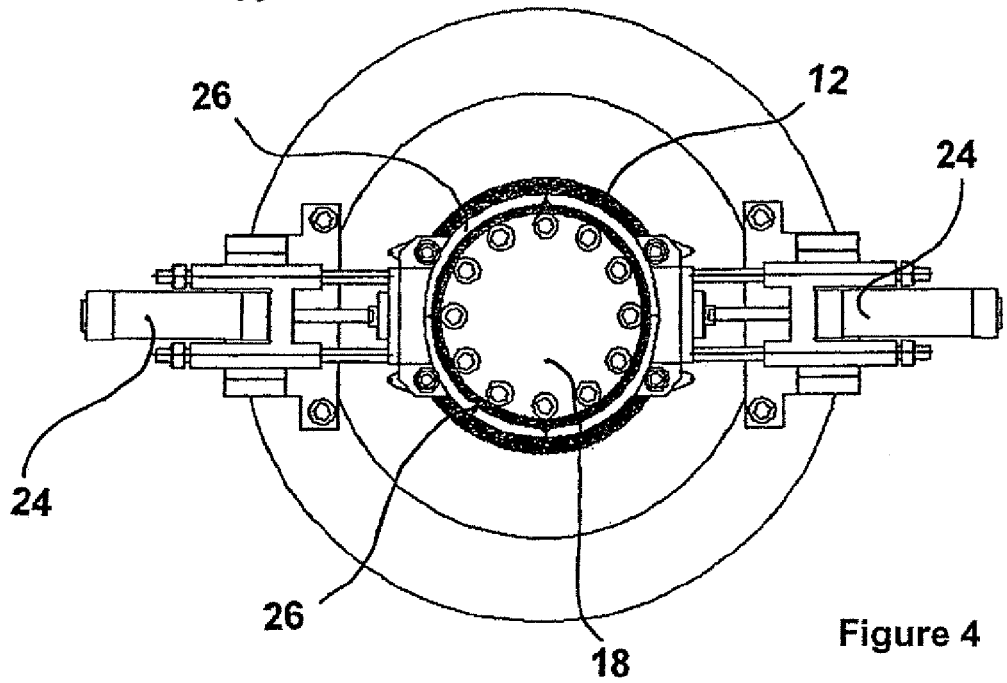

Conversely, in FIG. 4, each of the engagement means 22 has again been moved with the actuator 24 into the "closed" position, where the four circular segment elements 26 are brought into operative engagement with the ejected tubular preform 12. The tubular preform 12 is hereby deflected inwardly and pressed against the ring-shaped caking 20, so that the caking now adheres to stick to the inside on the tubular preform 12 and can subsequently be controllably transported away.

Figure 5:
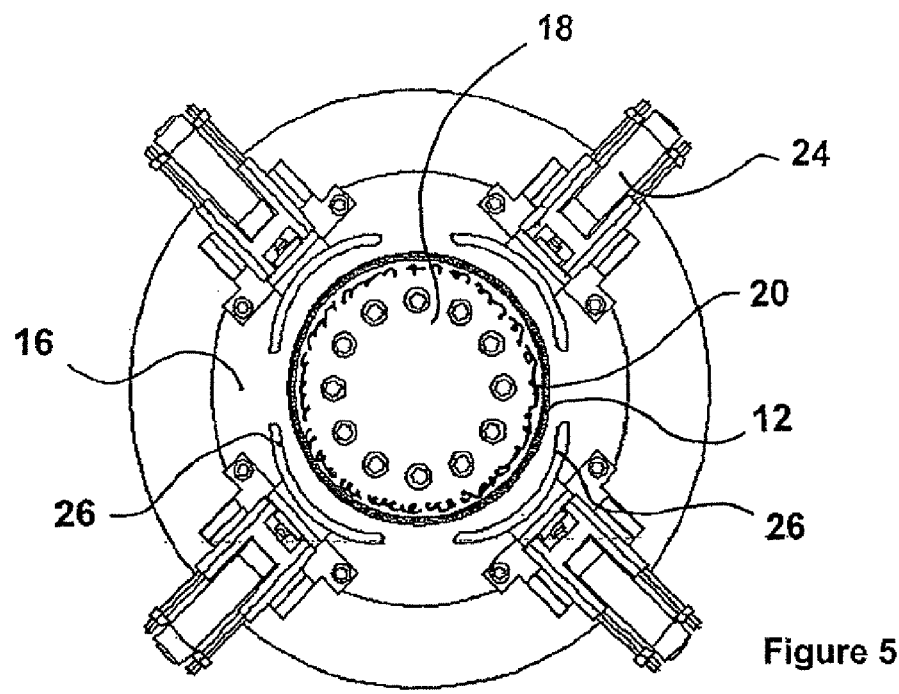
Figure 6:
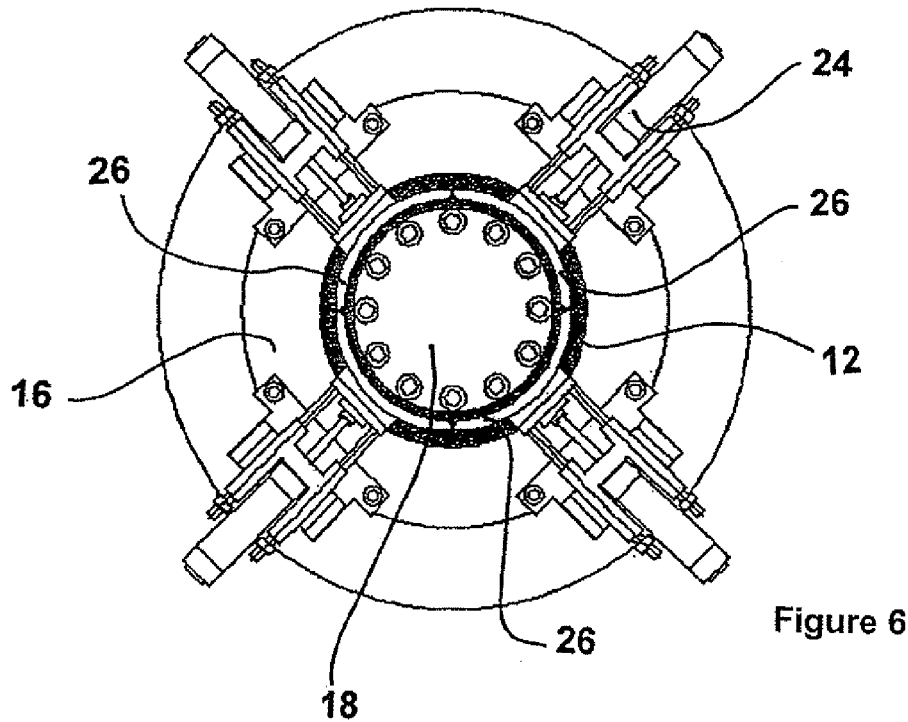

Another embodiment of an extrusion head 10 according to the invention is illustrated—also in a plan view from below—in FIG. 5, wherein the two engagement means 22 are moved into the unengaged "open" position by the respective actuators 24. Each of the four 90° circular segment elements 26 has here its own actuator 24. In FIG. 6, the engagement means 22 are again moved to the "closed" position and the four circular segment elements 26 are in operative engagement with the preform 12. The tubular preform is here completely enclosed from the outside, wherein the four 90° circular segment elements 26 form in the retracted position a substantially closed circular ring. According to the invention, the ejected plastic tube is hereby used as "cleaning agent". The tube is here briefly pushed to the side and moved with the corresponding engagement means or engagement device during the injection process, so that the cakings are "wiped off" and "stick" to the plastic tube. The actuators 24 can selectively be provided with an electro-pneumatic, electro-hydraulic or electrical drive.

The engagement means are advantageously constructed for adjustment in a height and/or depth direction (=radial direction), so that they can be adapted to the particular requirements of the exiting tube and the intended deflection with corresponding upsetting.

Figure 7:
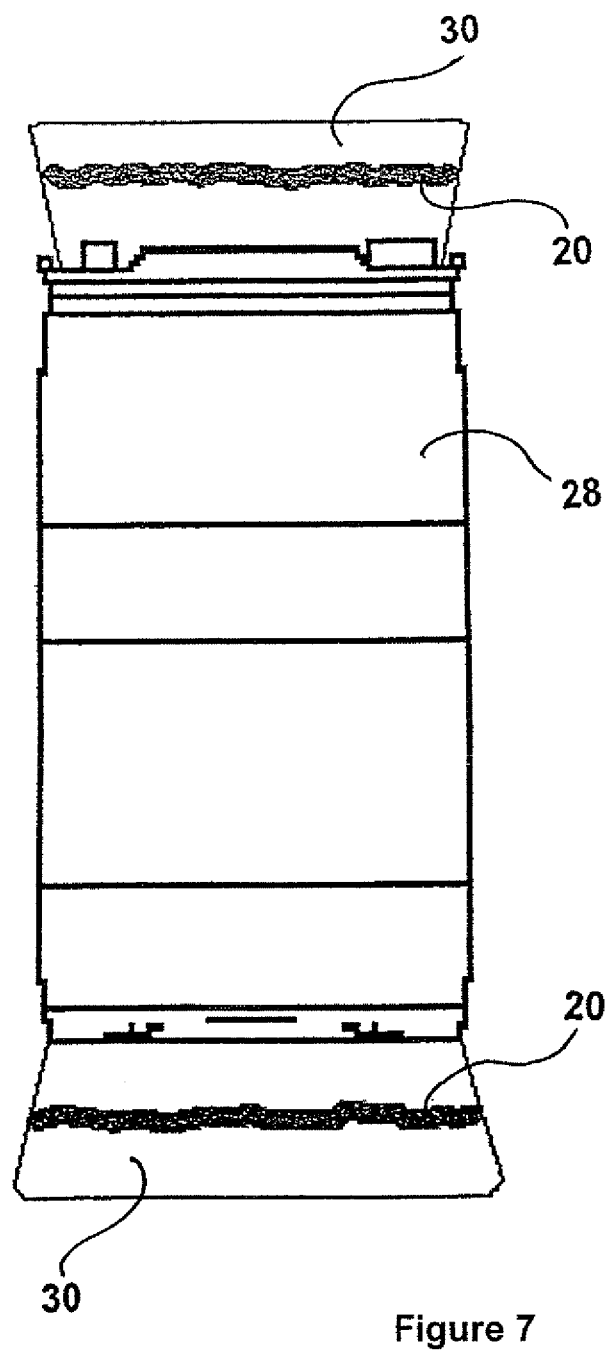

FIG. 7 shows as an example for a blow-molded product a plastic tight-head drum 28 which has just been removed from the blow mold, wherein the squeezed-off scrap pieces, so-called slug pieces 30, still adhere to the upper and lower edge of the drum.

According to the method of the invention, the cakings 20 have been transported from the discharge nozzle exactly into these regions of the scrap pieces, so that there is typically no loss in production due to the incorporated coke residues.

This invention provides the technical teaching how to automatically clean in a comparatively simple and cost-effective manner and with low structural complexity the discharge region of the extrusion tools during the continuing operation of the continuous extrusion without interrupting the production process. The material deposits contaminating the product are specifically transported away and controllably removed from the production process.

What is claimed is:

1. A method for cleaning an extrusion head involved in extrusion of thermoplastic material expelled or extruded from an extrusion nozzle as a tubular preform, said method comprising:
    embracing the tubular preform from outside directly after exiting the extrusion nozzle by at least two rib-shaped partly circular pressing elements; and
    moving the at least two partly circular pressing elements in a radial direction to embrace and briefly deflect and upset the tubular preform without impeding a continuous flow of the tubular preform as the tubular preform exits the extrusion nozzle so that deposits adhering on both sides in a proximate region of an exit gap of the extrusion nozzle stick to the tubular preform for transporting the deposits away from the exit gap by the tubular preform which acts as a cleaning element.

2. The method of claim 1, wherein the tubular preform is deflected in predetermined time intervals.

3. The method of claim 1, further comprising detaching the tubular piece from a completely blown hollow body as waste slug piece.

4. The method of claim 1, further comprising sorting out the tubular piece with adhering deposits, after deflection of the tubular preform, for subsequent removal from a further production process.

5. The method of claim 1, wherein the partly circular pressing elements enclose the tubular preform from outside by almost 360° directly below the extrusion nozzle.

6. An extrusion head, comprising: an extrusion nozzle for extruding a tubular preform;
    at least two mechanical engagement members in the form of partly circular rib-shaped pressing elements arranged directly below the extrusion nozzle; and
    a drive moving the engagement members in a radial direction and into operative contact with the tubular preform from outside to thereby embrace the tubular perform and readially deflect and upset the tubular perform without impeding a continuous flow of the tubular perform as the tubular perform exits the extrusion nozzle in the absence of any mechanical contact between the engagement members and the extrusion nozzle.

7. The extrusion head of claim 6, wherein the mechanical engagement members include each at least two circular segment elements, said drive having actuators operably connected to the segment elements to move the segment elements in the radial direction.

8. The extrusion head of claim 7, wherein the circular segment elements are configured to enclose the tubular preform from outside by almost 360° and to form a substantially closed circular ring in a retracted position.

9. The extrusion head of claim 7, wherein the drive is a member selected from the group consisting of an electro-pneumatic drive, electro-hydraulic drive, and electrical drive.

10. The extrusion head of claim 7, wherein the engagement members are constructed in at least one of two ways, a first way in which the engagement members are adjustable in a height direction, a second way in which the engagement members are adjustable in a depth direction (radial direction).

* * * * *